(No Model.)

D. MURRAY.
THILL COUPLING.

No. 405,109. Patented June 11, 1889.

Witnesses.
Selma R. Schelin.
Robt. A. Southworth.

Inventor.
Daniel Murray.
by Alban Andrew
his atty.

UNITED STATES PATENT OFFICE.

DANIEL MURRAY, OF SALEM, MASSACHUSETTS.

THILL-COUPLING.

SPECIFICATION forming part of Letters Patent No. 405,109, dated June 11, 1889.

Application filed January 7, 1889. Serial No. 295,610. (No model.)

*To all whom it may concern:*

Be it known that I, DANIEL MURRAY, a citizen of the United States, and a resident of Salem, in the county of Essex and State of Massachusetts, have invented new and useful Improvements in Thill-Couplings, of which the following, taken in connection with the accompanying drawings, is a specification.

This invention relates to improvements in thill-couplings for carriages, and it is carried out as follows, reference being had to the accompanying drawings, wherein—

Figure 1:
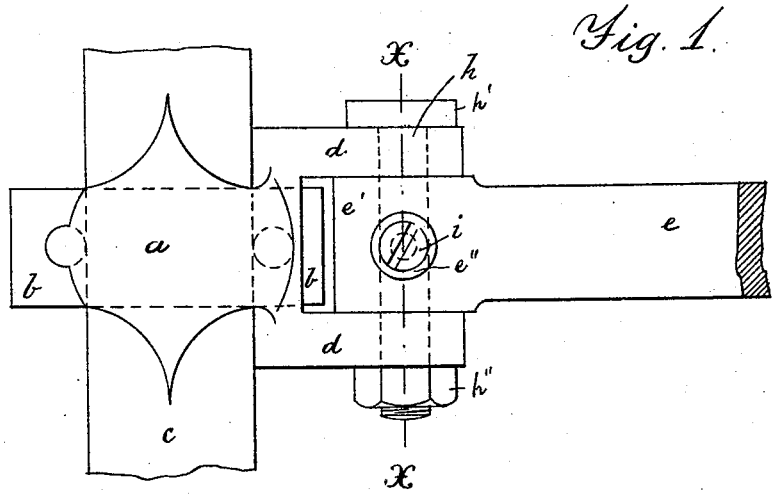
Figure 2:
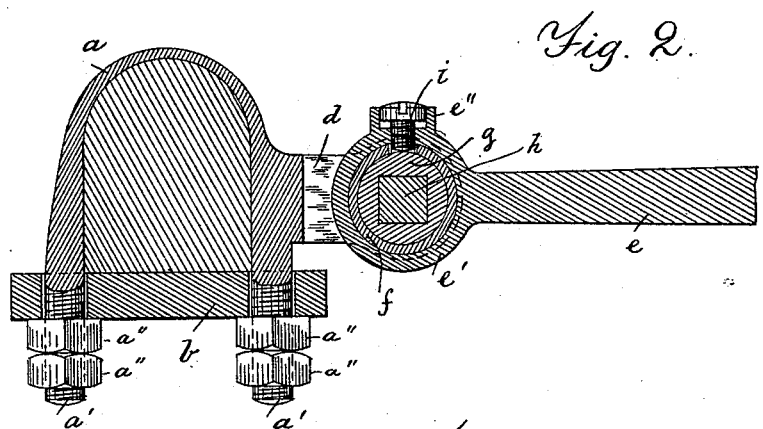
Figure 3:
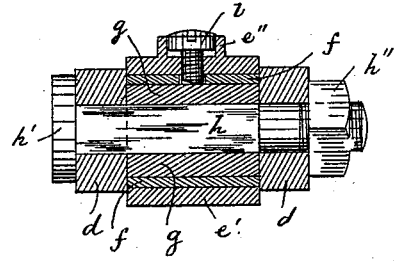

Figure 1 represents a plan view of the improved thill-coupling, and Fig. 2 represents a longitudinal section of the same. Fig. 3 represents a cross-section on the line X X shown in Fig. 1.

Similar letters refer to similar parts wherever they occur on the different parts of the drawings.

$a$ represents the clasp, with its screw-bolts $a'$ $a'$ and nuts $a''$ $a''$, by means of which and the yoke $b$ said clasp is firmly secured to the carriage-axle $c$ in the usual manner. In one piece with the said clasp $a$ and projecting to one side of it are the ears or bearing-pieces $d$ $d$, as shown in the drawings.

$e$ represents the shaft-iron provided with the cylindrical bored-out hub $e'$, within which is driven or otherwise firmly secured the metal sleeve $f$, made of hardened and tempered steel, and within said sleeve $f$ is journaled the cylindrical hub or friction-block $g$, which latter is held stationary relative to the ears $d$ $d$ by means of the bolt $h$, which is preferably made square or polygonal and adapted to pass through correspondingly-shaped perforations in the friction-block $g$ and ears $d$ $d$, as shown, so as to prevent said hub or friction-block $g$ from turning around its axis. The bolt $h$ has in one end a head $h'$, and is screw-threaded in its other end, and there provided with a nut $h''$, as shown in Figs. 1 and 3, by which arrangement said bolt is firmly secured to the ears $d$ $d$ and hub $g$.

$i$ is a friction-screw passing through a screw-threaded perforation in the cylindrical hub $e'$, as well as through a perforation in the sleeve $f$, as shown in the drawings, the inner end of which screw bears against the hub $g$ more or less, according to the friction desired between it and the interior of the sleeve $f$. I prefer to make in one piece with the hub $e'$ where the screw $i$ is located a cup $e''$, adapted to receive the head of said screw, so as to protect it and at the same give a neater and more finished appearance to the device. Said cup also serves for the purpose of introducing a lubricant through the perforations in the hub $e'$ and sleeve $f$ when the screw $i$ is removed. The screw $i$ is shown in the drawings as passing through the upper side of the hub $e'$; but this is not essential, as it may be made to pass through any other portion of said hub $e'$ without departing from the essence of my invention.

As will be noticed by reference to the drawings, the device is entirely void of springs, whether rubber or metal ones, which are liable to loose their elasticity, and thus cause the coupling to rattle.

With my invention I depend entirely upon the frictional resistance between the interior of sleeve $f$ and exterior of the stationary hub $g$ to keep the joint steady and to keep the device from rattling while in use. The sleeve $e'$ and hub $g$ being both made of hardened and tempered steel, very little wear takes place on such parts, and consequently the device is rendered very durable.

I do not desire to confine myself to the making of the device in the precise manner shown and described, as it may be varied, without departing from the essence of my invention, it being only necessary to employ in combination with the hub $e'$ and its hardened-steel sleeve or bearing $f$ some suitable device for holding the hardened-steel hub $g$ stationary relative to its brackets or supports $d$ $d$.

The hub $g$ and sleeve $f$ can easily be replaced with new ones should they become too much worn to render them unfit for further use.

Having thus fully described my invention, what I desire to secure by Letters Patent and claim is—

A thill-coupling consisting of the stationary polygonal pin $h$, the hub $g$, mounted and stationary on the pin, the shaft-iron having the cylindrical eye $e'$, the sleeve $f$, fitted in the eye concentric to and turning with the shaft-iron on the hub, and the set-screw $i$, passing laterally through the eye of the shaft-iron and engaging the sleeve to hold the latter stationary relatively to the said eye, substantially as described.

In testimony whereof I have signed my name to this specification, in the presence of two subscribing witnesses, on this 12th day of November, A. D. 1888.

DANIEL MURRAY.

Witnesses:
ALBAN ANDRÉN,
HELEN S. ANDRÉN.